United States Patent
Satran et al.

[11] Patent Number: 5,836,724
[45] Date of Patent: Nov. 17, 1998

[54] METAL CUTTING TOOL AND A REPLACEABLE SHIM FOR USE THEREWITH

[75] Inventors: Amir Satran; Yaron Eizen, both of Kfar Vradim, Israel

[73] Assignee: Iscar Ltd., Migdal Tefen, Israel

[21] Appl. No.: 792,306

[22] Filed: Jan. 31, 1997

[30] Foreign Application Priority Data

Feb. 2, 1996 [IL] Israel ........................................ 117015

[51] Int. Cl.⁶ .................................................. B23B 27/16
[52] U.S. Cl. ............................ 407/104; 407/40; 407/103
[58] Field of Search ..................................... 407/104, 103, 407/101, 73, 48, 46, 40, 34

[56] References Cited

U.S. PATENT DOCUMENTS

| | | |
|---|---|---|
| 3,829,943 | 8/1974 | Bartoszevicz et al. ................. 407/103 |
| 4,470,732 | 9/1984 | Lindsay ................................... 407/104 |
| 4,826,090 | 5/1989 | Orphall ..................................... 407/40 |
| 5,129,767 | 7/1992 | Satran et al. . |

FOREIGN PATENT DOCUMENTS

| | | |
|---|---|---|
| 0 247 011 | 11/1987 | European Pat. Off. . |
| 0 161 505 B1 | 1/1989 | European Pat. Off. . |
| 0 111 649 | 8/1991 | European Pat. Off. . |

*Primary Examiner*—Andrea L. Pitts
*Assistant Examiner*—Mark Williams
*Attorney, Agent, or Firm*—Pennie & Edmonds LLP

[57] ABSTRACT

A metal cutting tool comprising a tool holder formed with at least one insert receiving pocket and a replaceable shim formed by powder pressing and sintering and having an elongated rib formed integrally therewith along an edge thereof and being releasably retainable in an elongated recess formed along an edge of said pocket.

28 Claims, 6 Drawing Sheets

METAL CUTTING TOOL AND A REPLACEABLE SHIM FOR USE THEREWITH

FIELD OF THE INVENTION

This invention relates to a metal cutting tool comprising a tool holder formed with one or more insert receiving pockets, each pocket being provided with a replaceable shim.

BACKGROUND OF THE INVENTION

With such a cutting tool, the or each cutting insert is releasably retained in a respective pocket formed in a tool holder by, for example, a clamping screw which extends through a central hole formed in the insert into an appropriate tapped bore formed in the tool holder or, alternatively, by some other suitable clamping system. The interposition of a shim between the insert and the base surface of the tool holder pocket serves to protect the relatively costly tool holder body from deformation or damage through use. Shims of differing heights can be employed so as to vary, as required, the specific location of the cutting insert and in particular that of the cutting edge with respect to the tool holder. Generally, where such shims are employed with screw bolted inserts, the shim is retained in position in the pocket by means of the same screw used to secure the insert, which screw passes through an aperture formed in the shim aligned with the bore of the insert. It will be readily appreciated that this method of securing the shim to the tool holder is inconvenient, particularly in view of the fact that during replacement of an insert, the shim is no longer secured to the holder and can either become lost or forgotten when the operator forgets to replace the shim. It has been proposed in such cases (see EP 247,011) to retain the shim in position even after the detachment of the insert by the provision of a special sleeve with internal and external threading. Such an arrangement, however, is both complicated and expensive.

In order to overcome this problem, and also to ensure that the shim is effectively secured to the tool holder even when the insert is retained by means other than a central locking screw, it has been proposed (EP 161,505) to retain the shim in position with respect to the tool holder quite independently of the releasable retention of the insert, and this by means of a centrally disposed, tubular split pin which is inserted into the tool holder and retains the shim in position. It has been found in practice, however, that the retaining pin often becomes broken and this in itself can have undesirable consequences in the use of the cutting tool. Additionally, with shims so retained, difficulties are often encountered in releasing the shim for replacement and such replacement may become time consuming.

It has been proposed in our U.S. Pat. No. 5,129,767 to provide the seating shim with an integrally formed split tubular coupling portion which is capable of spring compression and which is inserted into a corresponding tubular recess formed in the seating pocket. Once inserted, the coupling portion expands against the wall of the recess, ensuring the effective and independent retention of the shim in the seating pocket.

However, the seating shim proposed in our prior U.S. patent, in common with most, if not all, prior art seating shims, are made from cast steel and therefore have to undergo significant metal cutting operations such as drilling and grinding after heat treatment, so as to render them suitable for use. In consequence, the shim cannot readily be mass produced.

It is an object of the present invention to provide a new and improved metal cutting tool and an insert seating shim for use therewith which substantially overcomes many of the above-referred-to disadvantages.

BRIEF SUMMARY OF THE INVENTION

According to the present invention, there is provided a cutting tool comprising a tool holder; a receiving and retaining pocket formed in said tool holder; base and side walls of said pocket; a cylindrical recess formed in a region of a junction of the base and a side wall of said pocket coextensive with and opening out into said pocket via a slot having a transverse dimension $D_1$ and being of substantially circular arc-like cross-sectional shape having a diameter $d_1$ where $d_1 > D_1$ and subtending an angle greater than 180°; and a replaceable shim formed by pressing and sintering a metal powder and comprising a plate-like body portion having upper, base and side walls; a rib member formed integrally with one of said side walls and projecting beyond said base wall of said body portion, an outer surface of said rib member, transversely opposing portions of said outer surface substantially symmetrically disposed along the length of said rib being located on a right circular cylindrical envelope of diameter $d_2$ which subtends an angle of at least 180°, said rib furthermore having axially extending portions located between said transversely opposing portions and having a transverse dimension $D_2$ where $D_1 \geq D_2 > d_2$ where $d_2$ is slightly greater than $d_1$ such that when the base of said shim is disposed angularly with respect to the base wall of said pocket, said rib is freely insertable into said recess and said shim is pivotally displaceable about said recess with at least said opposite peripheral surface portions of said rib in tight frictional contact with the walls of said recess so as to ensure retention of said shim in said pocket with the shim in close abutment with the base wall of the pocket.

Preferably, said opposing portions are constituted by axially directed, cylindrical strips which can either extend along the entire length of the rib or along central or terminal extents thereof. The or each axially extending portion can be formed between axially extending substantially planar surfaces of the rib, of which a pair can be mutually perpendicular. These planar surfaces can be substantially parallel with one of them being substantially flush with an upper wall of the body portion.

By virtue of the form of the shim in accordance with the invention, it can be formed by the powder metallurgy technology of compacting and sintering, the resulting product being very much harder than the previously produced cast steel shims. Furthermore, the product can be mass produced at relatively low cost, requiring only the grinding of the upper surface and honing around. Furthermore, the integrally formed positioning and retaining rib is readily and freely insertable into a correspondingly formed cylindrical recess in the insert retaining pocket. A simple pivotal movement of the rib with respect to the recess results in the frictional gripping of the rib within the recess and the effective retention of the shim in the receiving pocket with the shim in close abutment with the base wall of the pocket.

BRIEF SUMMARY OF THE DRAWINGS

For a better understanding of the present invention, and to show how the same may be carried out in practice, reference will now be made to the accompanying drawings, in which.

DETAILED DESCRIPTION OF PREFERRED EMBODIMENT

Figure 1:
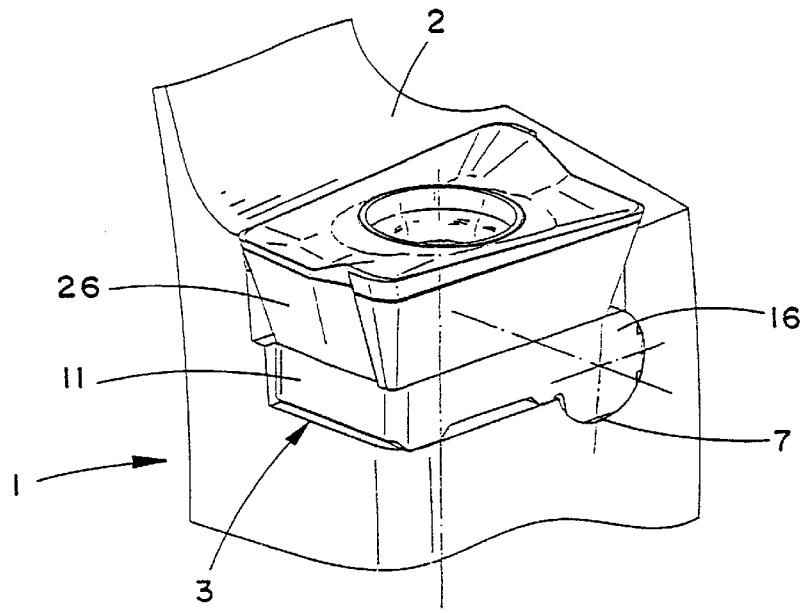
FIG. 1 is a perspective view on an enlarged scale of a portion of the milling cutter forming part of a cutting tool in accordance with the present invention with cutting inserts placed in position on replaceable shims.
Figure 2:
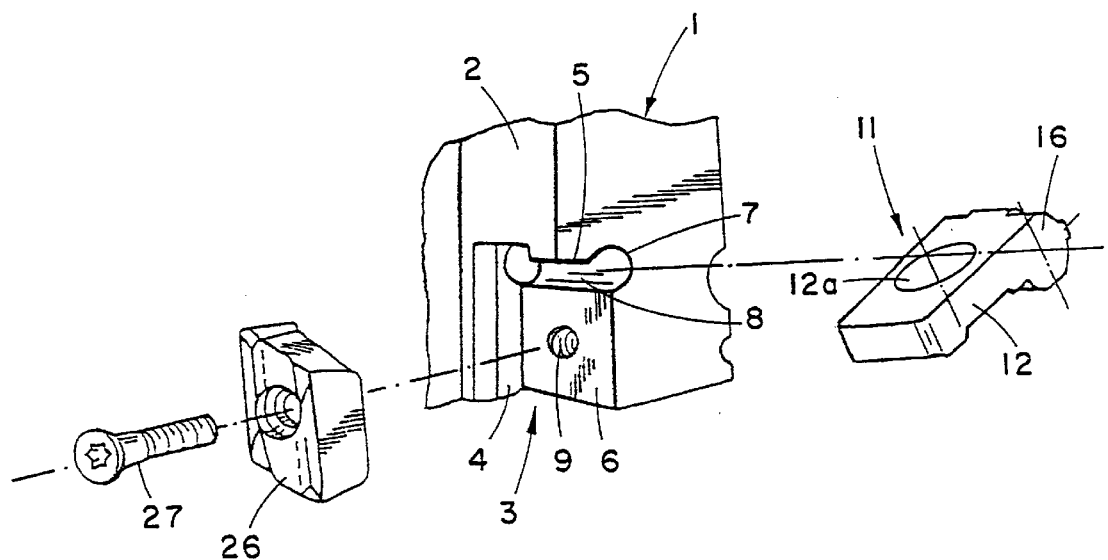
FIG. 2 is an exploded view on an enlarged scale of a detail of the cutting tool shown in FIG. 1.

Reference will now be made to FIGS. 1 and 2 of the drawings, which illustrate the application of the invention to a cutting tool in the form of a substantially standard milling cutter 1 which is formed with a plurality of peripherally distributed recesses 2, each recess having formed therein an insert retaining pocket 3 shown clearly in FIG. 3 of the drawings. Each pocket 3 is defined by a pair of side walls 4 and 5 and a base wall 6. An elongated cylindrical recess 7 is formed at the junction of the side wall 5 and the base wall 6 and opens into the pocket 3 via an elongated slot 8 which is co-directional with what would otherwise have been the linear junction of the side wall 5 and the base wall 6. Extending centrally into the base wall 6 is a tapped aperture 9.

An insert seating shim 11 formed by pressing and sintering a metal powder (e.g. a hard metal carbide powder) is constituted by a substantially rectangular plate-like body portion 12 having an upper planar surface 13, a lower base surface 14 and a surrounding side surface 15. The base surface 14 substantially corresponds in dimensions with those of the base wall 6 of the pocket 3. Formed in the body portion 12 is a through-going aperture 12a. Formed integrally with a side surface 15 of the body portion 12 is a rib retaining member 16 which is coextensive with the side surface with which it is integral.

Reference will now be made to FIGS. 3 through 8 of the drawings for a more detailed description of the insert seating shim 11 in accordance with the invention, and its insertion and retention in the pocket 3.

Figure 3A:
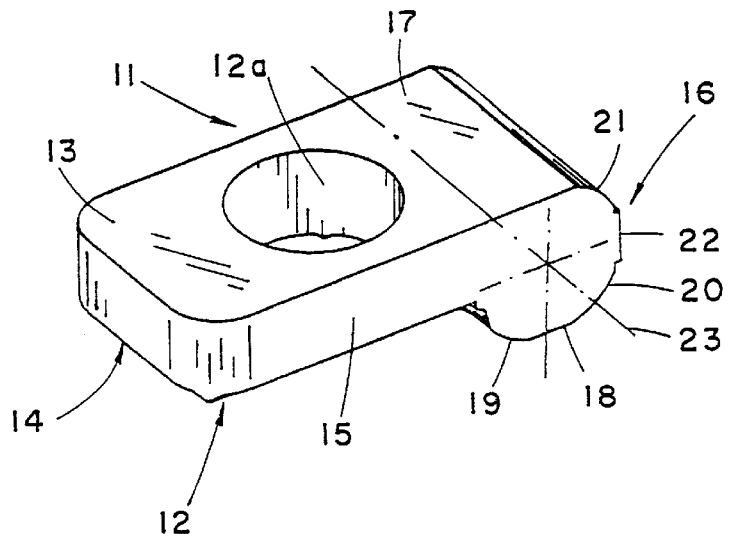
FIG. 3a is a perspective view from above of a replaceable shim in accordance with the invention.
Figure 3B:
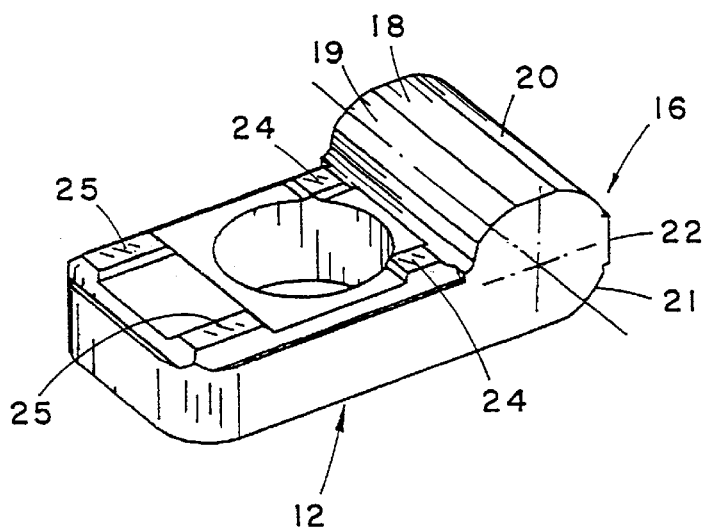
FIG. 3b is a perspective view from below of a replaceable shim in accordance with the invention.
Figure 3C:
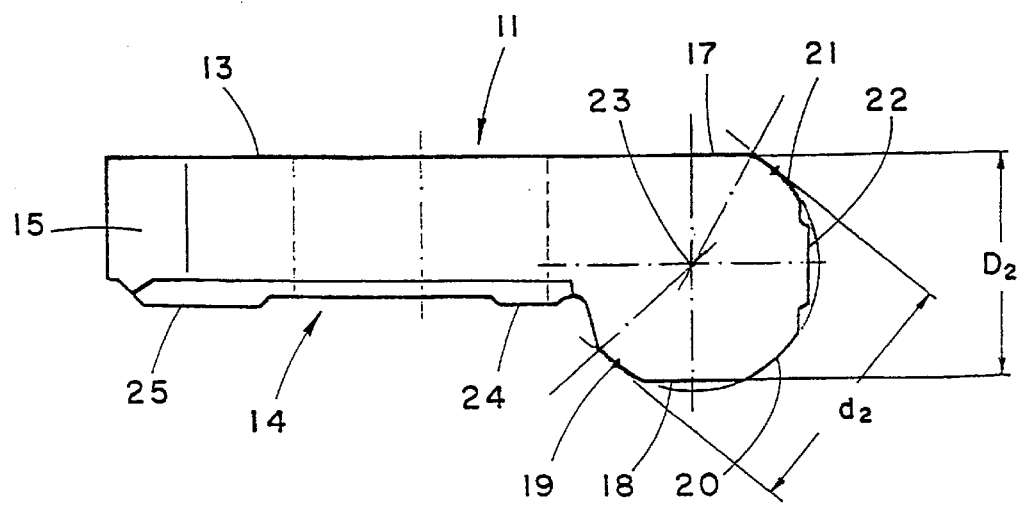
FIG. 3c is a side elevation of the insert seating shim shown in FIGS. 3a and 3b.
Figure 7:
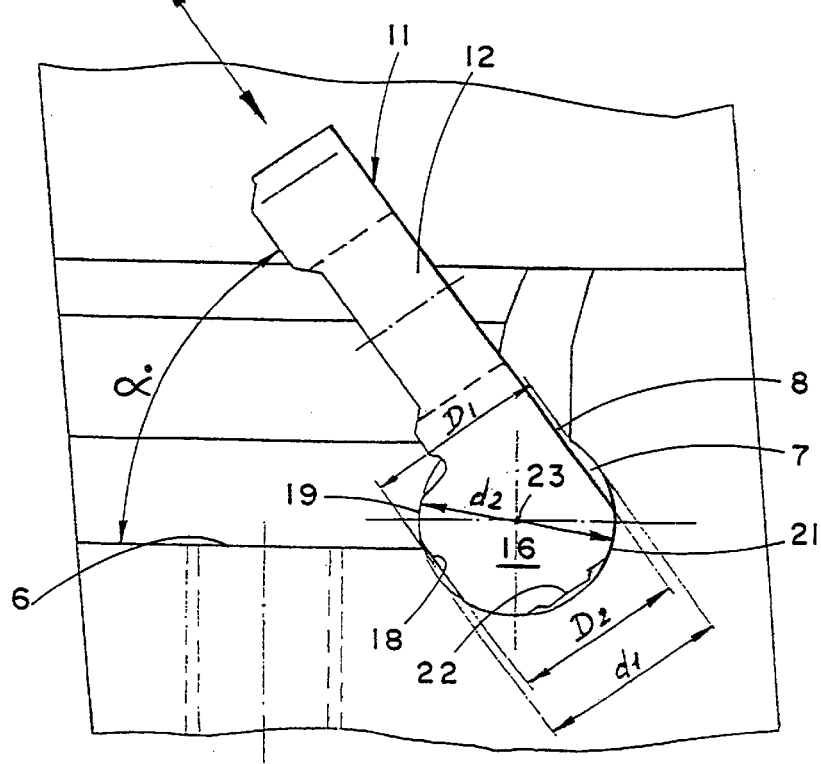
FIG. 7 is a side elevation of the tool portion shown in FIG. 6 showing relative dimensions of the cooperating portions of the retaining rib and the recess.

As can be seen in the drawings, the rib member 16 has an outer surface which is of substantially circular arcuate cross-sectional shape having, as seen in FIGS. 3c and 7 of the drawings, a diameter $d_2$ and subtending an angle greater than 180°. The rib member 16 has an upper, planar surface 17 which, as shown, is preferably flush with the upper, planar surface 13 of the body portion 12 of the seating shim 11. The rib member 16 projects beyond the base surface 14 of the body portion 12, having a lowermost, substantially flat, axially directed surface 18 substantially parallel with the upper surface 17 and the upper and base surfaces 13 and 14 of the body portion 12. The flattened surfaces 17 and 18 are spaced apart by a distance $D_2$.

As can be seen in FIGS. 3a, 3b and 3c, on either side of the flattened surface 18 are cylindrical strip portions 19 and 20, whilst the upper surface 17 merges with a cylindrical strip portion 21. The strip portions 19, 20 and 21 lie on a right circular cylindrical envelope of diameter $d_2$, having an axis 23. The cylindrical strip portions 21 and 20 are separated by a flattened portion 22.

The flattened portion 22 is inset with respect to the cylindrical envelope and is substantially normal to the surfaces 17 and 18 and is located symmetrically with respect to an axis 23.

Figure 4:
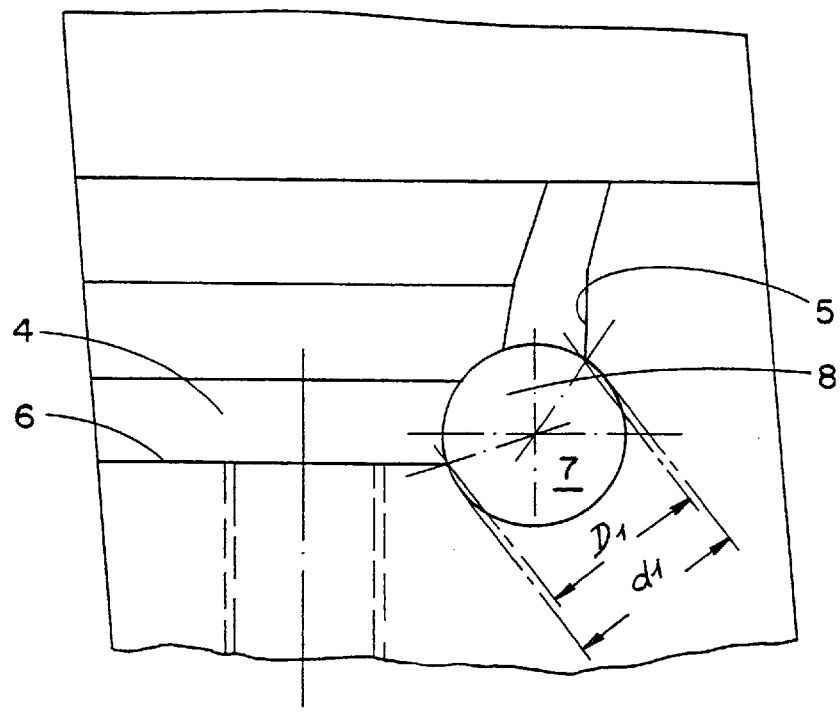
FIG. 4 is a schematic side elevation of an insert retaining pocket of a tool holder showing the relative dimensions of the recess.

As can be seen in FIGS. 3b and 4 of the drawings, the base wall 14 of the shim body portion 12 is formed at its outermost corners with a pair of abutment surfaces 25.

Figure 5:
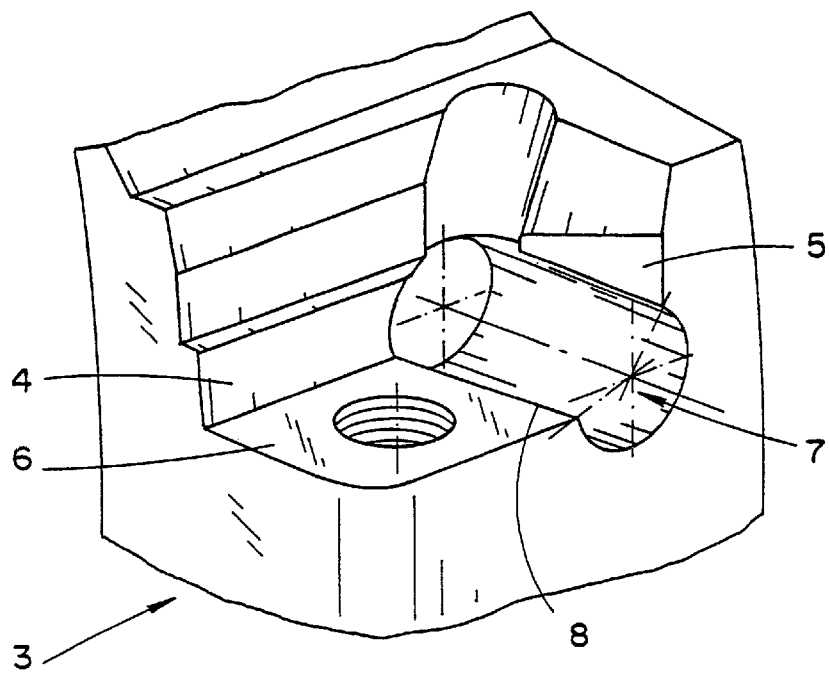
FIG. 5 is a perspective view of the receiving pocket of the tool holder.

Reference will now be made to FIGS. 4 and 5 of the drawings for a more detailed description of the elongated cylindrical recess 7 formed at what would otherwise be the junction of the side wall 5 and the base wall 6. The cylindrical recess 7 is of substantially circular, arc-like, cross-sectional shape subtending an angle greater than 180° and having a diameter $d_1$. The cylindrical recess 7 formed in the tool holder opens out into the pocket via the elongated slot 8 with which it is coextensive. The slot 8 has a transverse dimension $D_1$ where $d_1 \geq D_1$.

As seen in FIG. 7, the spacing $D_2$ between the flat surface portions 17 and 18 of the rib 16 must not be greater than the transverse dimension $D_1$ of the slot 8. The diameter $d_2$ of the right circular cylindrical envelope on which the cylindrically strip portions 19, 20 and 21 lie is very slightly greater than the diameter $d_1$ of the recess.

Figure 6:
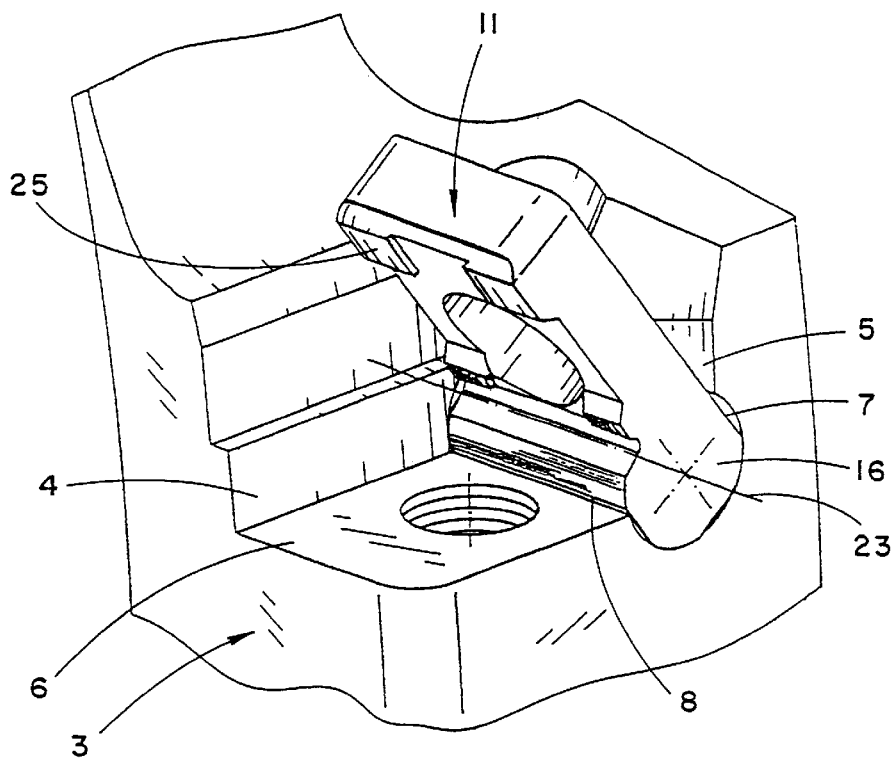
FIG. 6 is a perspective view of a tool portion with the replaceable shim as shown in FIGS. 3a, 3b and 3c with its retaining rib shown inserted into a corresponding recess formed in the seating of the milling cutter shown in FIG. 1.

If now, as shown in FIGS. 6 and 7 of the drawings, the shim 11 is orientated with respect to the base wall 6 of the pocket 3 by an acute angle α, the rib member 16 can be readily inserted into the recess 7 seeing that its minimum lateral spacing $D_2$ is not greater than the lateral dimension $D_1$ of the slot.

Figure 8:
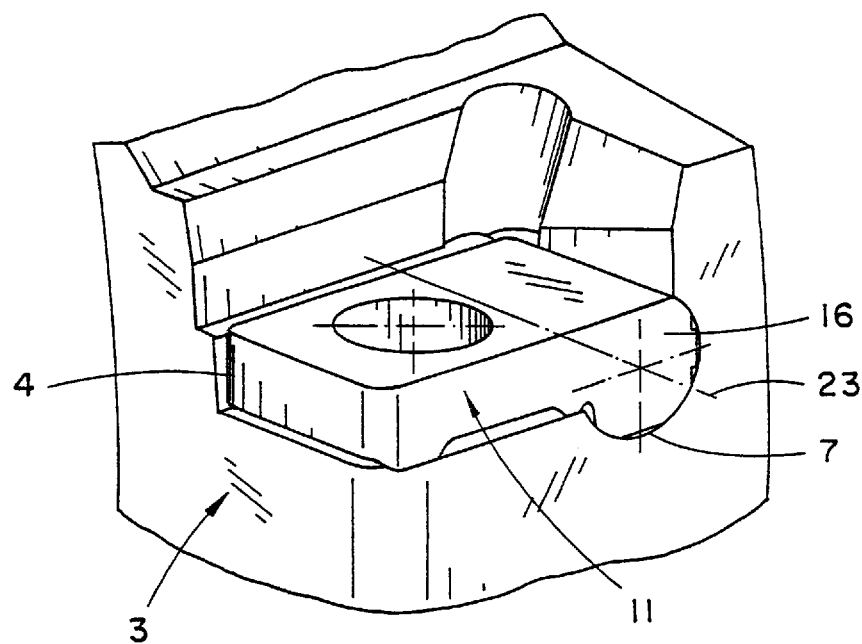
FIG. 8 is a perspective view of the replaceable shim positioned and retained in the tool holder seating.

If now, when in the position shown in FIGS. 6 and 7 of the drawings, the shim 11 is pivotally displaced with respect to the recess 7 in an anti-clockwise direction towards the base wall 6 of the pocket 3, the strip portions 19, 20 and 21 slide in tight, frictional contact with the inner surface of the cylindrical recess 7 so that, when the base surface 14 of the body portion 12 of the shim 11 has reached its final position with the abutment surfaces 25 in close abutment with the base wall 6 of the pocket 3, the rib member 16 is tightly retained within the recess 7 and, in consequence, the shim 11 as a whole is retained in position in pocket 3, as seen in FIG. 8.

When in this position, a cutting insert 26 can be placed on the shim 11 and can be firmly secured to the tool holder by means of a locking screw 27 passing through the insert and the shim for screw tightening within the pocket.

In operational use, the area of abutment of the rib within the recess is directed to the region where the main cutting forces act and, at the same time, firm seating of the shim in the pocket is ensured within reasonable tolerance levels.

Removal of the insert 26 has no effect on the retention of the shim 11 in the pocket 3 and when it is desired to remove the shim 11 from the pocket 3, the shim 11 is rotated in a clockwise direction away from the base 6 of the pocket 3 until the flat surface portions 17 and 18 of the rib 14 are aligned with the edges of the slot 8, allowing for the rib member 16 to be extracted from the recess 7.

Figure 9A:
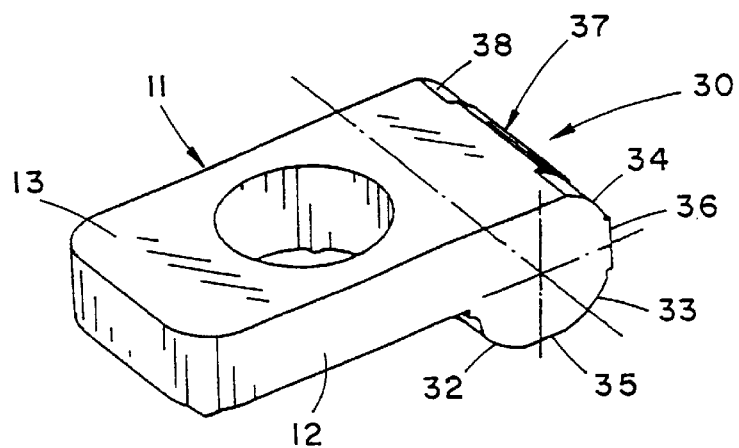
FIGS. 9a and 9b are respectively perspective views from above and below of a modified form of replaceable shim in accordance with the invention.
Figure 9B:
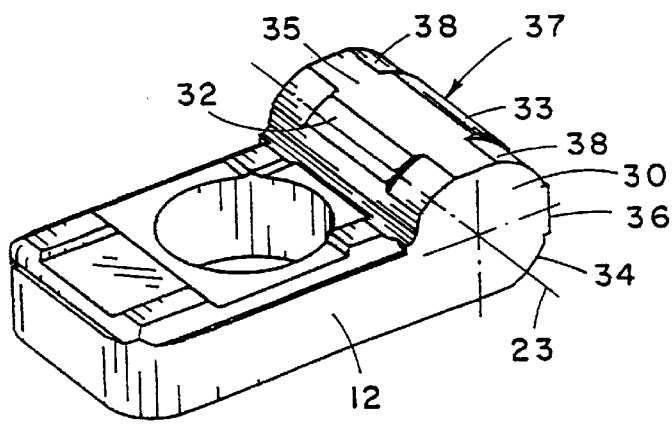

Whilst in the embodiment just described the rib member 16 is of uniform, lateral dimensions along its entire length, in that the cylindrically curved strip portions 19, 20 and 21 extend along the entire length of the rib member 16, in the embodiment shown in FIGS. 9a and 9b of the drawings, a rib member 30 is formed with cylindrically strip portions 32, 33 and 34 which are separated from each other by substantially flat portions 35 and 36. Each of the strip portions 32, 33 and 34 is located on a central section 37 which lies on a cylindrical envelope of diameter $d_2$, whilst the terminal sections 38 of each such strip portions 32, 33 and 34 lie on a cylindrical envelope having a lesser diameter. The introduction, clamping and retention of the rib member 30 takes place in a manner similar to that described above with reference to the embodiment shown in the preceding drawings, it being understood that it is the central section 37 of the strip portions 32, 33 and 34 which slide frictionally with respect to the adjacent surface of the cylindrical recess 7.

Alternatively, the rib member may be provided at its terminal portions with cylindrically curved strip portions of a diameter so as to slide frictionally within the cylindrical recess, these terminal portions being separated by central portions of reduced diameter.

In both cases, the limitation of the lengths of the strip portions which fit frictionally within the cylindrical recess ensures that the reduction in contact area with the surface of the cylindrical recess reduces the frictional resistance to insertion and pivotal displacement of the rib member into the cylindrical recess.

Figure 10:
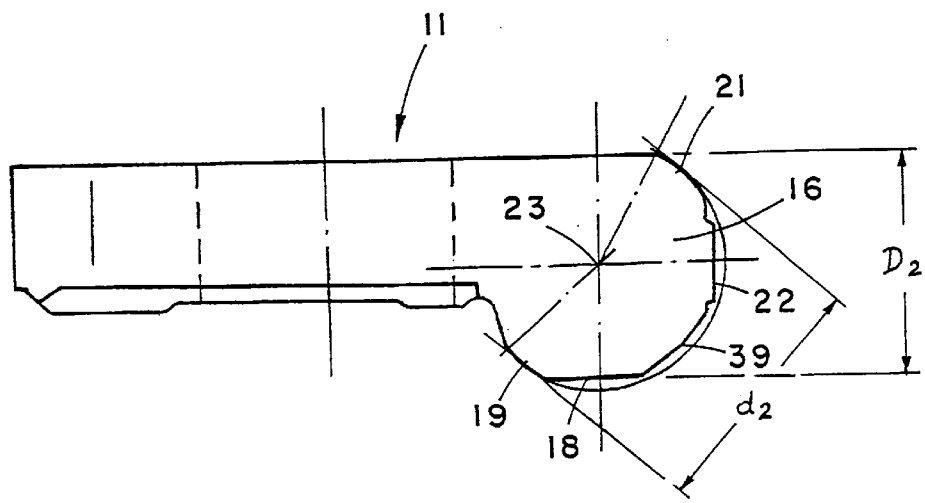
FIG. 10 is a schematic side elevation of a modified form of replaceable shim in accordance with the invention.

In an alternative embodiment shown schematically in FIG. 10 of the drawings, the cylindrically curved strip portion 20 shown in FIGS. 3a, 3b and 3c has been replaced by a chamfered portion 39 no longer in contact with the adjacent surface of the cylindrical recess. By limiting this contact to the strip portions 19 and 21 which are oppositely located, the tolerance requirements for the rib member are reduced, leading to a simplification in manufacture.

In a still further modification, the contact of one of the cylindrically curved strip portions with the recess surface can be replaced by an effective line contact located on the same cylindrical envelope as an oppositely disposed curved strip portion.

Whilst in the embodiments described above the rib members 16, 31 are formed integrally with a side surface of the shim member which, in the tool, is directed radially with respect to the tool, it will be appreciated that retention of the shim member in the tool holder can be equally well effected if the rib member is associated with an axially directed side surface and the recess formed in the pocket of the tool holder is also directed axially.

In one characteristic example of a metal cutting tool in accordance with the invention, the tool was designed to have the following dimensions:

$D_1$=4.72 mm $d_1$=5.00 mm $D_2$=4.50 mm $d_2$=5.02 mm

Furthermore, in the embodiment shown in FIGS. 9a and 10b of the drawings, the lengths of the central rib portions 32, 33 and 34 which are in contact with the adjacent surface of the recess should not be less than 0.25 the overall length of the rib.

It will be readily appreciated that the design of the retaining rib with cylindrically curved strip portions of limited peripheral extent separated by flattened portions considerably facilitates the production of the shim by conventional compacting and sintering powder metal technology. In a preferred embodiment, cemented carbides are employed and in fact scrap cemented carbide powders can be used.

We claim:

1. A cutting tool comprising a tool holder; a receiving and retaining pocket formed in said tool holder; base and side walls of said pocket and a replaceable shim releasably retainable in said pocket; wherein said tool holder has a cylindrical recess formed in a region of a junction of the base wall and a side wall of said pocket, said recess being coextensive with, and opening out into, said pocket via a slot having a transverse dimension $D_1$ and being of substantially circular arc-like cross-sectional shape having a diameter $d_1$ where $d_1 > D_1$ and subtending an angle greater than 180°; said replaceable shim being formed by pressing and sintering a metal powder so as to form a plate-like body portion having upper, base and side walls; a rib member formed integrally with one of said side walls, said rib member having a longitudinal axis and projecting beyond said base wall of said body portion, an outer surface of said rib member being provided with axially directed peripheral portions substantially symmetrically disposed along the length of said rib member, said peripheral portions being transversely opposed to each other with respect to the length of the rib member and being located on a right circular cylindrical envelope of diameter $d_2$, said rib member furthermore having axially extending portions located between said transversely opposing peripheral portions and having a transverse dimension $D_2$ where $D_1 \geq D_2 > d_2$ where $d_2$ is slightly greater than $d_1$ such that when the base wall of said shim is disposed angularly with respect to the base wall of said pocket, said rib member is freely insertable into said recess and said shim is pivotally displaceable about said recess with at least said peripheral portions of said rib member in tight frictional contact with the walls of said recess so as to ensure retention of said shim in said pocket with the shim in close abutment with the base wall and the pocket.

2. A cutting tool according to claim 1, characterized in that said rib member and said recess are substantially normally directed with respect to a longitudinal axis of the tool holder.

3. A cutting tool according to claim 1, characterized in that said rib member and said recess are directed substantially parallel with respect to a longitudinal axis of the tool holder.

4. A replaceable shim formed by pressing and sintering a metal powder, said shim comprising a plate-like body portion having upper, base and side walls; and a rib member formed integrally with one of said side walls, said rib member having a longitudinal axis and projecting beyond said base wall of said body portion, an outer surface of said rib member being provided with axially directed peripheral portions substantially symmetrically disposed along the length of said rib member, said peripheral portions being transversely opposed to each other with respect to the length of the rib member and being located on a right circular cylindrical envelope of diameter $d_2$, said rib member furthermore having axially extending portions located between said transversely opposed peripheral portions and having a transverse dimension $D_2$ where $d_2 > D_2$.

5. A replaceable shim according to claim 4, characterized in that said peripheral portions are constituted by axially directed, cylindrical strips.

6. A replaceable shim according to claim 4, characterized in that at least one of said opposing portions constitutes a substantially line contact portion.

7. A replaceable shim according to claim 4, 5 or 6, characterized in that at least one of said portions extends substantially along the entire length of said rib member.

8. A replaceable shim according to claim 4, 5 or 6, characterized in that at least one of said portions extends along a central extent of the length of said rib member.

9. A replaceable shim according to claim 4, 5 or 6, characterized in that at least one of said portions extends along a terminal extent of the length of said rib member.

10. A replaceable shim according to any one of claims 4, 5 or 6, characterized in that said axially extending portions are formed between substantially planar surfaces of said rib member and furthermore provided with one or more axially extending, substantially planar portions respectively interposed between said axially extending portions.

11. A replaceable shim according to any one of claims 4, 5 or 6, characterized in that said rib includes at least one pair of mutually perpendicular, axially extending portions.

12. A replaceable shim according to claim 10, characterized in that said planar portions are substantially parallel, one of said planar portions being substantially flush with an upper wall of said body portion.

13. A cutting tool comprising:
a tool holder having a pocket formed therein, said pocket comprising base and side walls and a substantially arc-shaped recess formed in a region of a junction of the base wall and a side wall of said pocket, said arc-shaped recess subtending an angle of at least 180° and having a diameter of $d_1$, said arc-shaped recess opening out into said pocket via a slot having a transverse dimension $D_1$, wherein $d_1 > D_1$; and
a shim comprising a body portion having upper and lower surfaces, and a rib member integrally formed with said body portion and projecting beyond said lower surface of said body portion,
said rib member having:
a longitudinal axis,
spaced apart, first and second peripheral portions located on a cylindrical envelope of diameter $d_2$ centered about said longitudinal axis,
said first and second peripheral portions facing in substantially opposite directions, and
a first axially extending portion inset with respect to the cylindrical envelope and located between said first and second peripheral portions, said rib member having a thickness $D_2$ between said first axially extending portion and a substantially opposite second axially extending portion, wherein $d_2 > D_2$;
wherein said shim's rib member is positioned in said recess, said shim being rotatable between a first position in which at least one of said rib member's first and second peripheral portions is not in frictional abutment with a wall of said recess, to a second position in which both of said rib member's first and second peripheral portions are in frictional abutment with a wall of said recess.

14. The cutting tool of claim 13, wherein $D_1 \geq D_2$ and $d_2 > d_1$.

15. The cutting tool of claim 13, wherein said rib member and said recess are substantially normally directed with respect to a longitudinal axis of said tool holder.

16. The cutting tool of claim 13, wherein said rib member and said recess are directed substantially parallel with respect to a longitudinal axis of said tool holder.

17. A shim comprising a body portion having upper and lower surfaces, and a rib member integrally formed with said body portion and projecting beyond said lower surface of said body portion,
said rib member having:
a longitudinal axis,
spaced apart, first and second peripheral portions located on a cylindrical envelope of diameter $d_2$ centered about said longitudinal axis, said first and second peripheral portions facing in substantially opposite directions, and
a first axially extending portion inset with respect to the cylindrical envelope and located between said first and second peripheral portions, said rib member having a thickness $D_2$ between said first axially extending portion and a substantially opposite second axially extending portion, wherein $d_2 > D_2$.

18. The shim of claim 17, wherein at least one of said peripheral portions comprises a line contact portion extending along a length of the rib member.

19. The shim of claim 17, wherein said first and second peripheral portions comprise surfaces extending in an axial direction along a length of said rib member.

20. The shim of claim 17, wherein at least one of said peripheral portions extends substantially along the entire length of said rib member.

21. The shim of claim 17, wherein at least one of said peripheral portions extends along a central extent of the length of said rib member.

22. The shim of claim 17, wherein at least one of said peripheral portions extends along a terminal extent of the length of said rib member.

23. The shim of claim 17, wherein said second axially extending portion is substantially flush with the upper surface of said body portion.

24. The shim of claim 17, wherein said second axially extending portion is also inset with respect to said cylindrical envelope and is located between said first and second peripheral portions.

25. The shim of claim 24, further comprising a third peripheral portion located on said cylindrical envelope between said first and second axially extending portions.

26. The shim of claim 24, wherein said first and second axially extending portions extend along the entire length of the rib member.

27. The shim of claim 17, wherein said shim is formed from a pressed and sintered metal powder.

28. The shim of claim 27, wherein said rib member comprises a substantially cylindrical solid portion.

* * * * *